United States Patent [19]
Hill

[11] Patent Number: 5,804,902
[45] Date of Patent: Sep. 8, 1998

[54] MULTI-PHASE ELECTRIC MACHINE WITH JOINED CONDUCTOR LANES

[76] Inventor: Wolfgang Hill, Ortenbergstrasse 3, D-76135 Karlsruhe, Germany

[21] Appl. No.: 720,781

[22] Filed: Oct. 3, 1996

[30] Foreign Application Priority Data

Apr. 6, 1994 [DE] Germany .......................... 44 11 749.3
Apr. 5, 1995 [WO] WIPO ...................... PCT/DE95/00459

[51] Int. Cl.⁶ .................................................. H02K 1/00
[52] U.S. Cl. .......................... 310/179; 310/260; 310/270; 310/116
[58] Field of Search .................................. 310/179, 116, 310/182, 260, 270

[56] References Cited

U.S. PATENT DOCUMENTS

| | | | |
|---|---|---|---|
| 4,785,213 | 11/1988 | Satake | 310/116 |
| 4,945,296 | 7/1990 | Satake | 318/538 |
| 5,402,026 | 3/1995 | Gertmar et al. | 310/182 |
| 5,422,526 | 6/1995 | Kawabata et al. | 310/201 |
| 5,616,977 | 4/1997 | Hill | 310/179 |

*Primary Examiner*—Thomas M. Dougherty
*Assistant Examiner*—Timothy A. Williams

[57] ABSTRACT

In prior art multi-phase electric machines in which conductor parts are interlace to form conductor lanes for various phases, the connection points are on the winding end, thus permitting only a very limited local possibility for welding of the conductor ends. In addition, the manufacturing cost is increased with an odd number of phases, since the design is asymmetrical and a number of different formers necessary is relatively high. The invention calls for prefabricated conductor parts (17) to be welded or soldered in the zones which will subsequently be located in the soft magnetic body. Divided bars with a high conductor cross-sectional area are connected before the insertion of soft magnetic segments, connection zones which are large relative to the conductor cross-sectional area are realized, and problems with the insulation are avoided. In three-phase machines, the conductor lanes are interlaced with each other, all conductor lanes being identical in design and the same pattern is repeated every four pole pitches. This connection technique and conductor progression permits the inexpensive manufacture of reliable electric motors and generators as well as uniform space utilization in three-phase equipment.

4 Claims, 3 Drawing Sheets

MULTI-PHASE ELECTRIC MACHINE WITH JOINED CONDUCTOR LANES

BACKGROUND OF THE INVENTION

1. Field of the Invention

The invention concerns a multi-phase electric machine with joined windings as well as a manufacturing process for such a machine based on PCT/DE 95/00459, filed on Apr. 5, 1995, with priority of the German application P 44 11 749.3, filed on Apr. 6, 1994.

2. Description of the Prior Art

From U.S. Pat. No. 4,115,915, German patent 41 11 626 C2, and German patent 42 34 145 C1 bar windings are known wherein the conductor lanes are joined together from sections. The junctures of said sections lie in the winding overhangs and permit only locally limited welding of the contact surfaces in order to decrease transition resistance.

In DE-B-1 026 841, a bar-shaped conductor is described wherein the center section consists of sectional conductors which, still inside the groove, are morticed to solid conductor parts. The winding overhangs are joined to the solid conductor parts in the usual manner. In the solid conductors which are lying in the groove elevated losses occur due to current displacement and the costs for executing the many junctures are high.

In H. Sequenz: "Wechselstrom-Sonderwicklungen" ["Alternating Current Special Windings], Vol. 3, Vienna 1954, page 348, divided bars are described which, complementing each other in pairs, are each twisted 180°. The bars which are cut from sheet metal receive their final shape by bending and are subsequently axially inserted into the grooves by pairs.

Further, from German patent 27 41 415 a two-layer bar winding is known wherein the center groove of a group of coils is used for only one current pass-through each by means of asymmetric utilization. In this configuration, a special bar realizes the transition from the upper to the lower layer. The special bar possesses in the grooves twice the cross section of the regular bars and, like the regular bars, is joined in the winding overhangs to the succeeding groove bars.

The invention is, therefore, based on the objective to advance the development of a multi-phase electric machine wherein the conductor lanes are joined from prefabricated parts in such a manner that a simple and secure connection of conductor parts, even of those with large conductor cross sections, is possible and a complete and even utilization of space is achieved.

SUMMARY OF THE INVENTION

The objective is solved in accordance with the invention by the characteristics of claim 1 and claim 5.

In accordance with the invention, the complete and even utilization of space is achieved in multi-phase electric machines by joining conductor lanes made from prefabricated conductor parts in sections of said conductor lanes, said conductor lanes having an approximately constant cross section, in such a manner that the prefabricated conductor parts possess at least 2 sections that are located in a magnetic field during operation of the machine and that are separated by at least one section that is located outside the magnetic field during operation of said machine.

Without having to consider bending radii, U-shaped prefabricated conductor parts are brought into their final position and are welded together in those sections that thereafter are lying within the magnetic field. This permits the production of interlaced multi-phase windings wherein the prefabricated parts, even for large machines, are of small outer dimensions and that are prefabricated as drop-forged part, cast part or from powdered metal. By welding in the area of the grooves instead of on the faces of the winding overhangs, large contact areas can be realized that are weldable without problem, since insulation is applied after that step prior to insertion of the soft magnetic segments.

Advantageously, groove bars fill the space of a groove completely by twisting said groove bars at their ends by 180°, said groove bars lying side by side parallel to the groove width, and by welding their prefabricated halves located inside the groove to opposite surfaces which lie parallel to the groove depth. The welding area consists of almost the entire length of the groove which permits the realization of large welded connection zones, even for small welding depth relative to the conductor cross section.

In three-phase machines, interlaced conductor configurations result in identical conductor lanes, said conductor configurations repeating periodically every four pole pitches and in which within one period four differently configured conductor parts are switched in series. This ensures a stable construction free from play and the space in the winding overhangs is completely and evenly utilized.

The drawings show advantageous embodiments of the invention.

DETAILED DESCRIPTION OF THE PREFERRED EMBODIMENT

Figure 1:
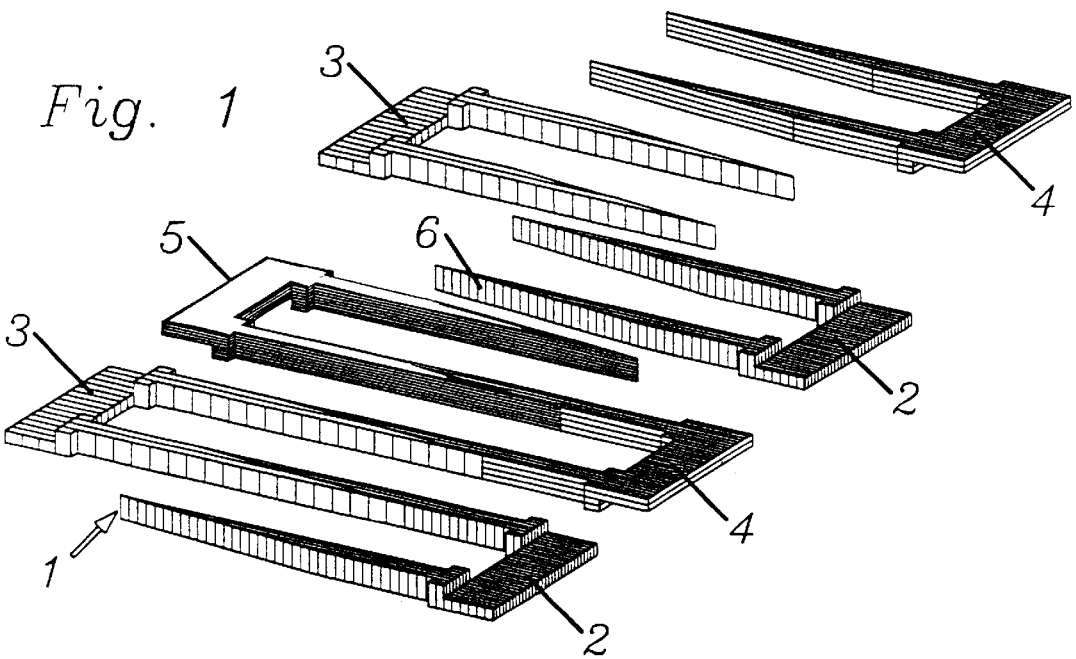
FIG. 1 shows a section of a linearized conductor lane from a three-phase conductor layer as it is joined.

The section from a conductor lane (1) in a three-phase conductor layer shown in FIG. 1 contains seven pole pitches or seven prefabricated U-shaped parts (2 to 5) respectively that are joined in the area of the groove at long, slanted contact surfaces (6). The conductor progression repeats every four pole pitches wherein by utilization of symmetries two U-shaped structural parts each (2 and 3) or (4 and 5) respectively are identical. This advantageous reduction of structural conductor parts does not only apply to linear motors but, when bent at different axes and with differently configured ends, is also transferrable to rotating radial and axial air gap machines.

All conductor lanes of a three-phase machine are identical due to their interlaced conductor progression wherein all conductor parts (2 to 5") of an interlaced conductor layer are assembled into two winding overhang packets in a previous work step.

Figure 2:
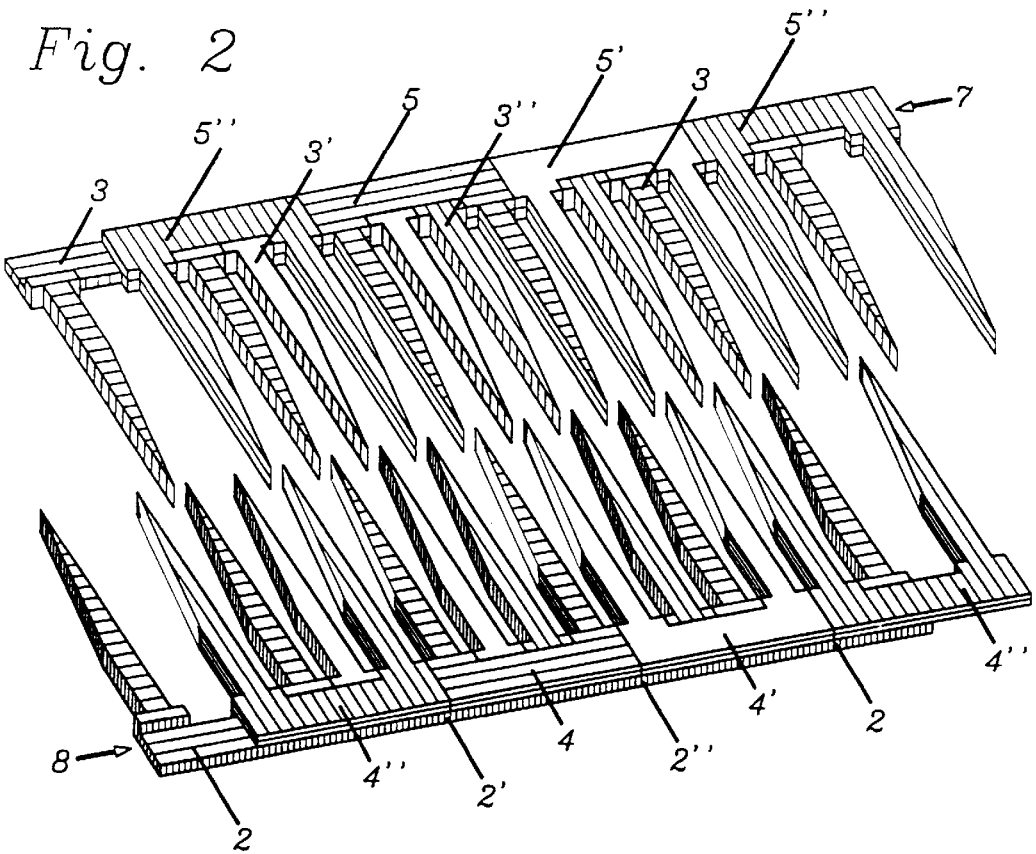
FIG. 2 shows a section from a linearized three-phase conductor layer prior to joining of the two winding overhang packets.

FIG. 2 shows the two winding overhang packets (7, 8) of a linearized three-phase machine which have been joined already in four pole pitches prior to pushing said packets together. Welding takes place exclusively in the area of the grooves prior to application of groove insulation. In this way, in spite of the low depth of penetration of a laser beam into pure conductor material, windings with very large cross sections can also be produced without problem. In multi-layer windings the interlaced conductor layers are stacked parallel to the groove depth wherein the transition between layers occurs either through a special asymmetric U-part or outside the winding overhang. The conductor parts (2 to 5") of the three phases are differently hatched.

Figure 3:
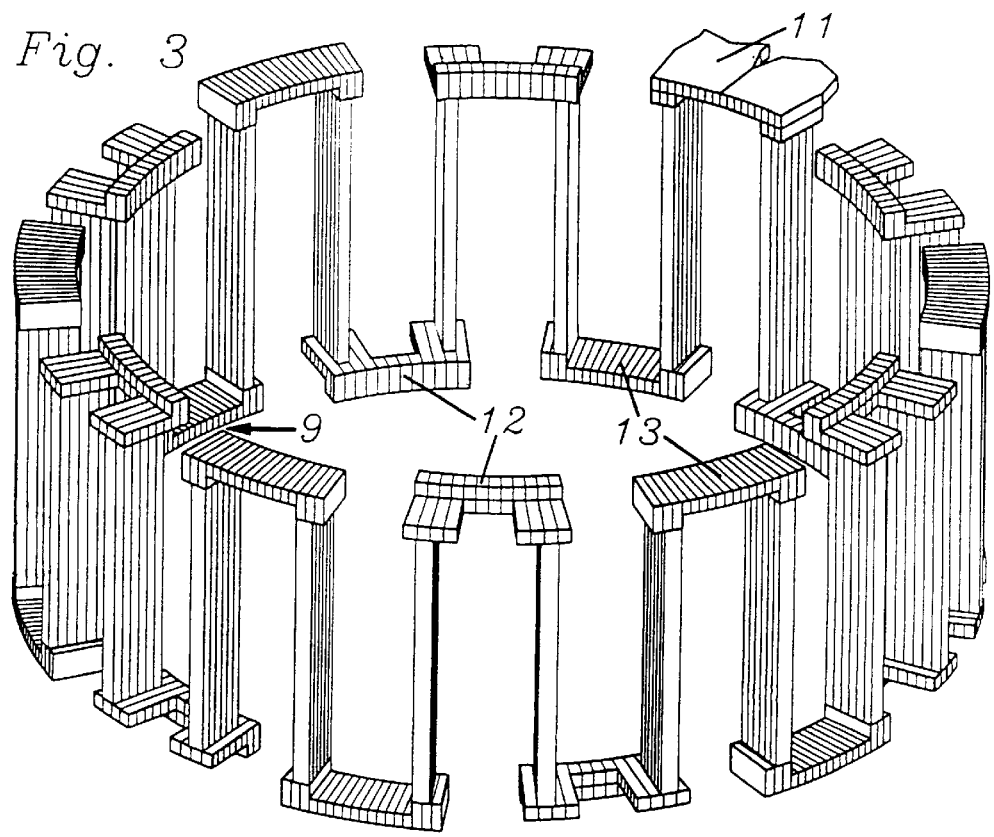
FIG. 3 shows the construction of a conductor lane of a 24-pole, three-phase radial air gap machine with one groove bar per groove.
Figure 4:
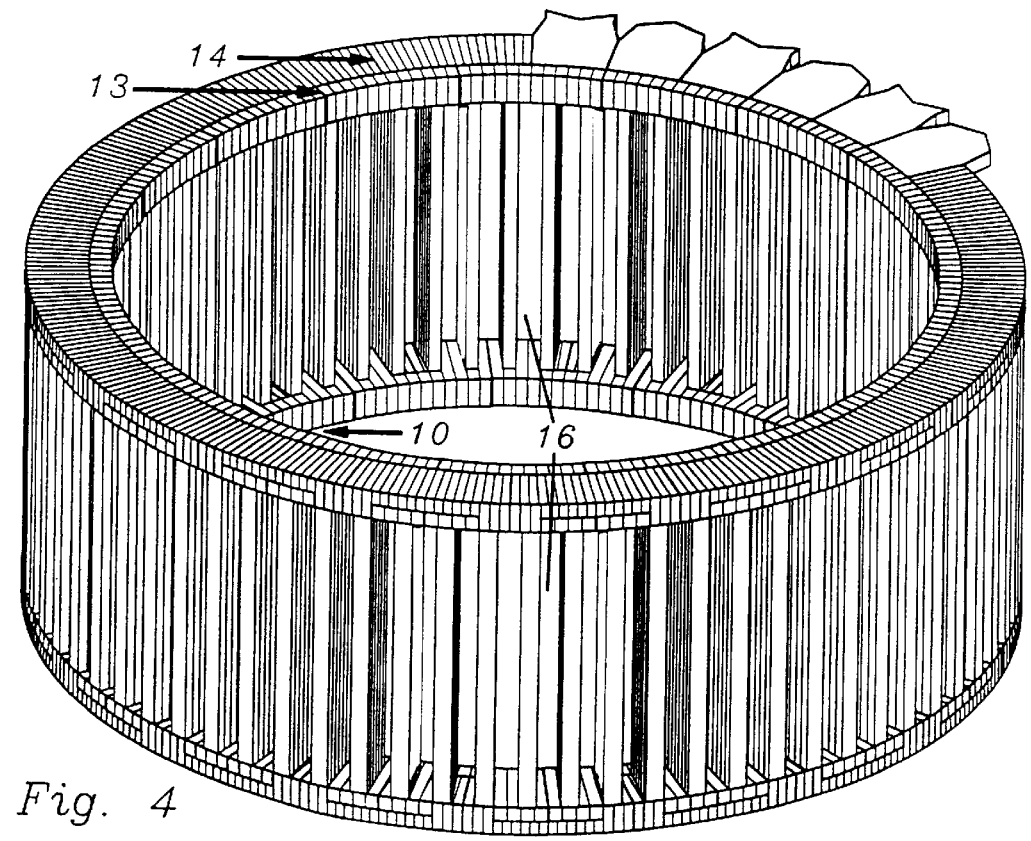
FIG. 4 shows the complete winding of the machine from FIG. 3.

In FIG. 3 and 4 a conductor lane (9) and the complete winding (10) of a 24-pole, three-phase machine with one groove bar per groove is shown. Beginning from the supply (11), the conductor lane (9) passes once in a meandering pattern through the circumference of the machine, requiring only two different U-parts (12, 13). All conductors are identical and are progressing in a set off pattern to each other by four groove separations each, so that the winding overhangs are utilized completely and uniformly. While the outer connections (13) progress only at the groove height (14), the inner connections (12) utilize the space (15) which lies axially in front of the yoke. The tangential connection of a conductor lane in a winding overhang occurs, therefore, always alternately in two different, annular winding overhang areas (14,15). After the entire winding (10) has been assembled and is ready to function, soft magnetic tooth segments are radially inserted into the free space between the conductors.

Figure 5:
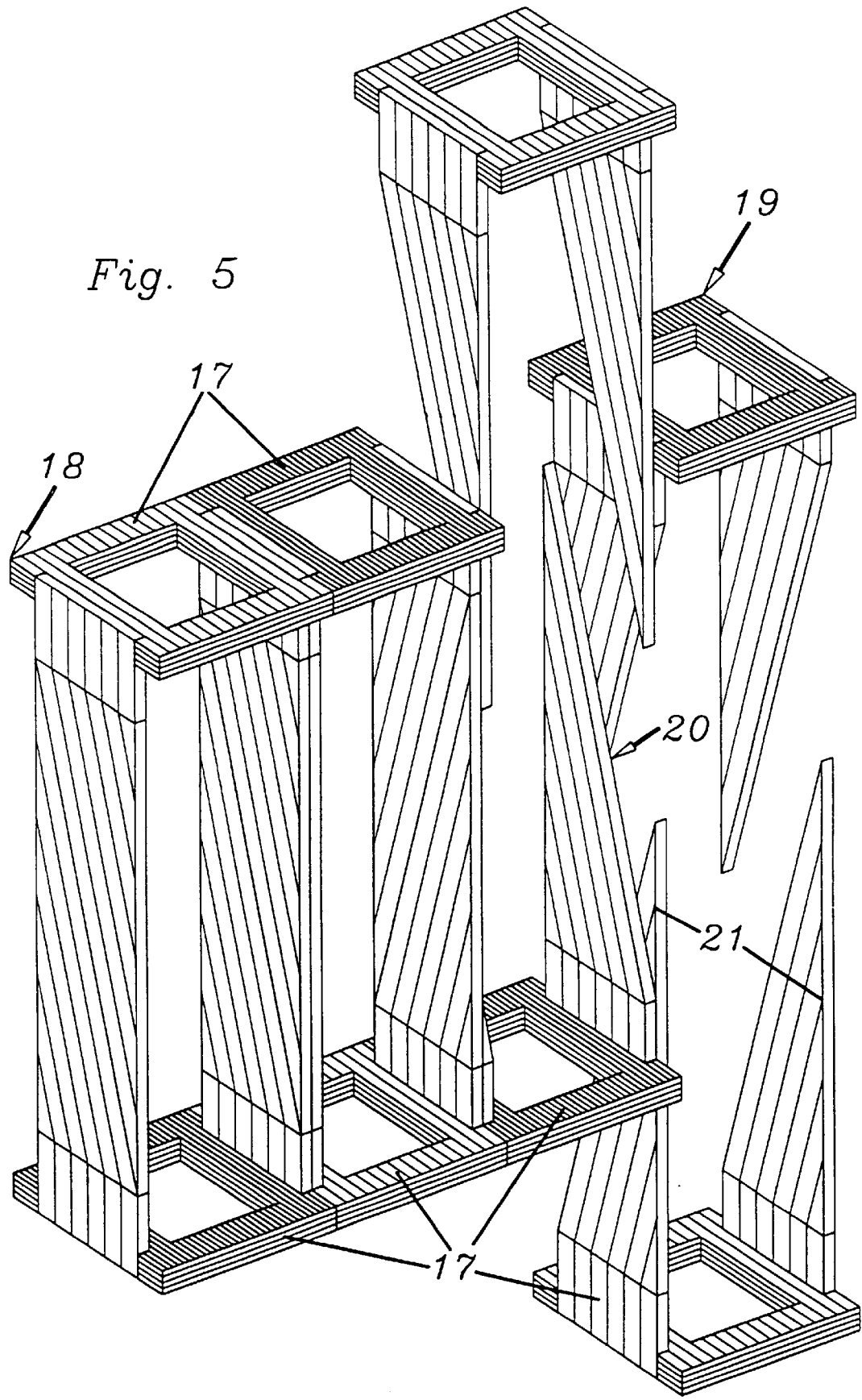
FIG. 5 shows a section from a linearized conductor lane with two divided bars per groove during joining of the prefabricated U-shaped parts.

In FIG. 5, eight identical U-parts (17) are shown in a linearized section comprising four pole pitches, wherein the ends of four U-parts together fill one rectangular groove. They belong to two conductor lanes (18, 19) which are advantageously switched in series and conduct current in the winding overhangs in different directions. At each passage through the groove each conductor lane is twisted 180°. In order to illustrate the change between the sides (20) of the groove, the two U-parts of a conductor lane (18) are pulled apart parallel to the groove length. If the U-parts (17) have at their ends indentations (21), a divided bar winding manufactured at little expense is the result, said divided bar winding utilizing, without being limited by current displacement, by means of only two divided bars even large groove cross sections with a very high space factor.

I claim:

1. A multi-phase electric machine consisting of a multi-phase winding, said multi-phase winding possessing conductor lanes, said conductor lanes consisting of sections and said conductor lanes having cross sections, a part of said winding lying during operation of said electric machine within the magnetic field of said electric machine, said conductor lanes of said machine being joined from prefabricated conductor parts in those said sections of said conductor lanes that are located within said magnetic field of said machine and said cross sections of said conductor lanes remaining approximately constant, wherein said prefabricated conductor parts consist of at least two said sections which are located within the magnetic field during operation of said machine and which are separated by at least one said section which is located outside said magnetic field during operation of said machine.

2. A multi-phase electric machine as recited in claim 1, wherein the conductor parts possess a U-shaped form in which the two ends form halves of groove bars and the cross sections of said ends are decreasing continuously towards the ends.

3. A multi-phase electric machine as recited in claim 2, wherein the two ends of conductor parts connected in one groove are arranged in different halves of the groove with respect to the groove width.

4. A multi-phase electric machine as recited in claim 1, wherein the conductor parts are prefabricated without bending radii and where the weld is located in the surface of a conductor lane whose normal lies approximately parallel to the direction of the magnetic field.

\* \* \* \* \*